(12) United States Patent
Fagan

(10) Patent No.: US 10,149,507 B2
(45) Date of Patent: Dec. 11, 2018

(54) DISTRESSED FABRIC PATCH AND METHOD

(71) Applicant: Jennifer J. Fagan, Scottsdale, AZ (US)

(72) Inventor: Jennifer J. Fagan, Scottsdale, AZ (US)

(*) Notice: Subject to any disclaimer, the term of this patent is extended or adjusted under 35 U.S.C. 154(b) by 395 days.

(21) Appl. No.: 14/743,219

(22) Filed: Jun. 18, 2015

(65) Prior Publication Data

US 2016/0128410 A1    May 12, 2016

Related U.S. Application Data

(60) Provisional application No. 62/077,379, filed on Nov. 10, 2014.

(51) Int. Cl.

| | |
|---|---|
| *B23B 43/00* | (2006.01) |
| *B23B 7/06* | (2006.01) |
| *A41H 27/00* | (2006.01) |
| *B32B 27/12* | (2006.01) |
| *B32B 27/40* | (2006.01) |
| *B32B 7/12* | (2006.01) |
| *B32B 7/14* | (2006.01) |
| *B32B 43/00* | (2006.01) |
| *B32B 7/06* | (2006.01) |

(52) U.S. Cl.
CPC ............. *A41H 27/00* (2013.01); *B32B 27/12* (2013.01); *B32B 27/40* (2013.01); *B32B 7/06* (2013.01); *B32B 7/12* (2013.01); *B32B 7/14* (2013.01); *B32B 43/00* (2013.01); *B32B 2255/02* (2013.01); *B32B 2262/062* (2013.01); *B32B 2307/30* (2013.01); *B32B 2437/00* (2013.01); *B32B 2556/00* (2013.01); *Y10T 156/1062* (2015.01); *Y10T 156/1309* (2015.01)

(58) Field of Classification Search
None
See application file for complete search history.

(56) References Cited

U.S. PATENT DOCUMENTS

| | | | |
|---|---|---|---|
| 3,138,505 A | * | 6/1964 | Hirsch ................... A41H 27/00 156/289 |
| 4,094,316 A | | 6/1978 | Nathanson |
| 4,244,996 A | | 1/1981 | Maloney |
| 4,715,914 A | | 12/1987 | Viner |
| 4,917,745 A | | 4/1990 | Speer |
| 6,261,396 B1 | | 7/2001 | Fessenden et al. |

(Continued)

OTHER PUBLICATIONS

Website page, products: distressed denim jeans (7 pages).

(Continued)

*Primary Examiner* — Linda L Gray
(74) *Attorney, Agent, or Firm* — Bycer Law, PLC; Matthew L. Bycer

(57) ABSTRACT

Many garments made of denim material have factory created one or more discontinuities exposing a group of parallel threads and referred to as "distressed denim". Sometimes, some or all of these threads become torn or rips or tears occur in the denim garment to create a discontinuity. A patch to cover the discontinuity is made of a plurality of side by side threads attached to one side of an adhesive panel and fabric material is attached to the other side of the adhesive panel. A plurality of adhesive strips essentially circumscribing the discontinuity adhere the patch to the rear side of the denim material and expose the threads through the discontinuity.

14 Claims, 2 Drawing Sheets

(56) References Cited

U.S. PATENT DOCUMENTS

| | | |
|---|---|---|
| 6,713,144 B2 | 3/2004 | Bundo et al. |
| 6,777,055 B2 | 8/2004 | Janssen et al. |
| 2009/0223622 A1* | 9/2009 | Llano .................... A41H 27/00 156/94 |
| 2014/0255466 A1* | 9/2014 | Mukobata ............. A61K 47/12 424/449 |
| 2015/0047769 A1* | 2/2015 | Quinn .................... B29C 70/30 156/94 |
| 2015/0072114 A1 | 3/2015 | Llano |

OTHER PUBLICATIONS

Website page, Denimsandjeans.com, (denim trends, reports, news & more), copyright 2014 (13 pages).
Website page, Rawr Denim, www.rawrdenim.com, copyright 2015 (11 pages).
Website page, Zazzle Inc., http://www.zazzle.com, copyright 2000-2015 (11 pages).

* cited by examiner

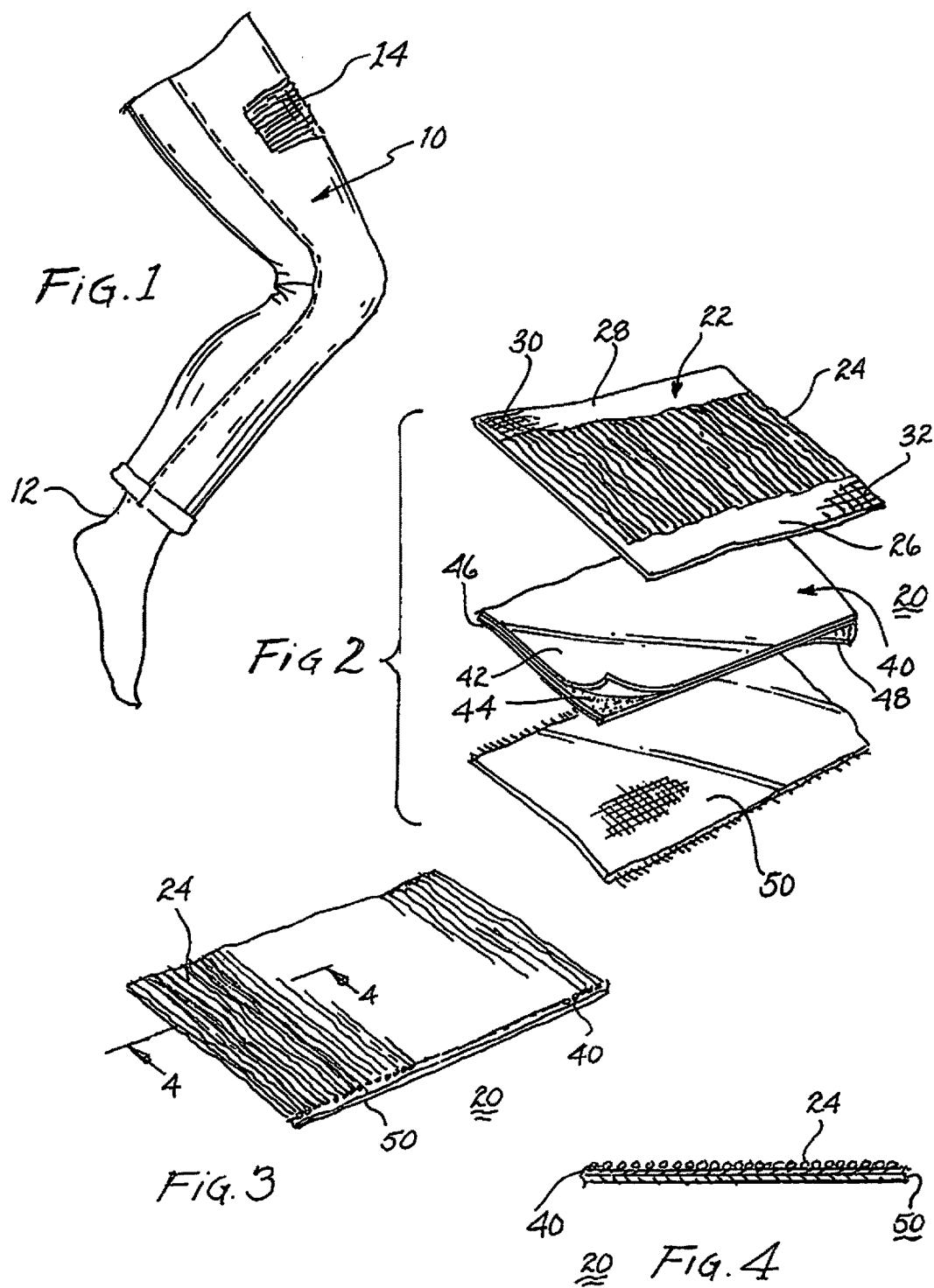

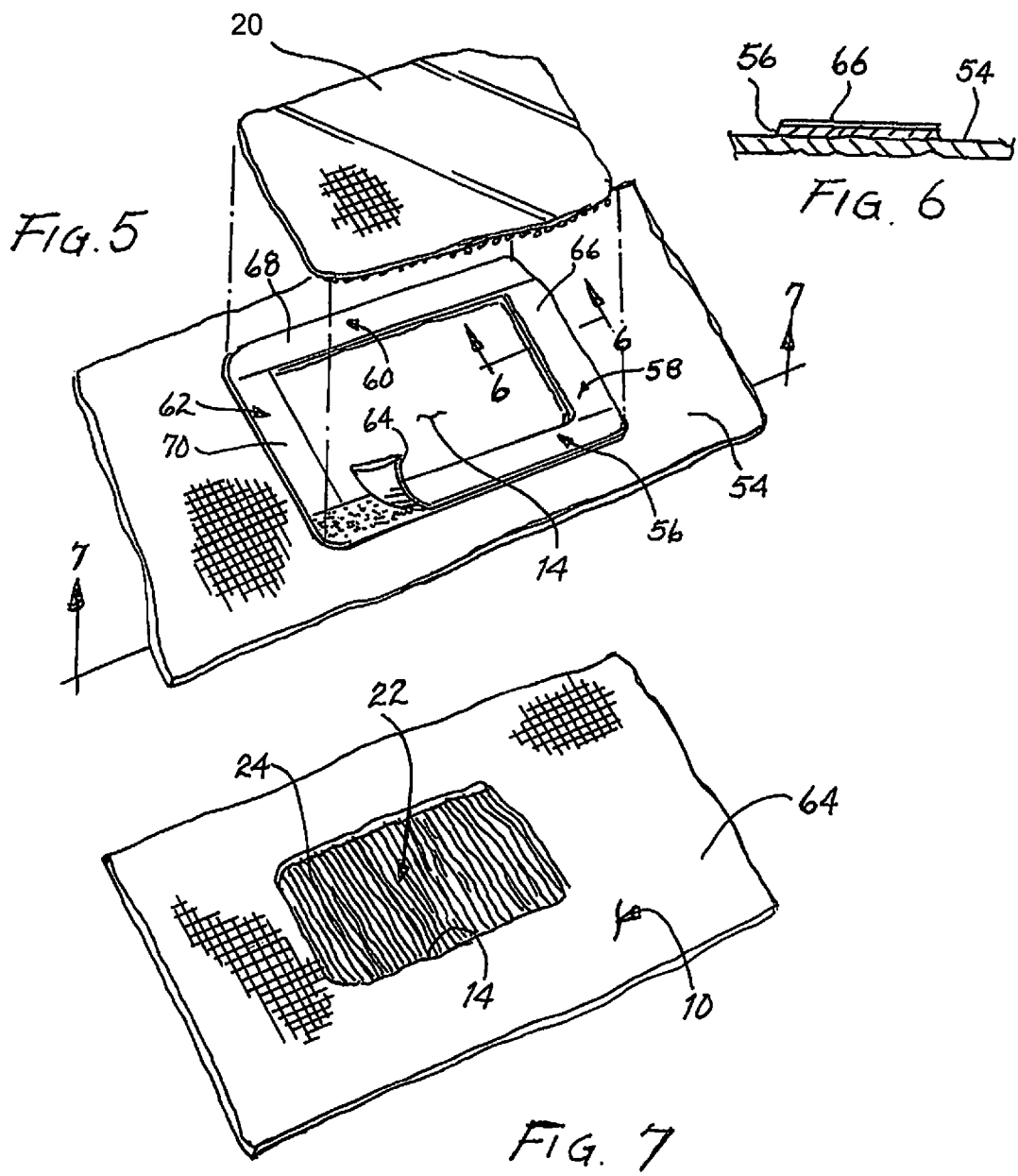

DISTRESSED FABRIC PATCH AND METHOD

CROSS REFERENCE TO RELATED APPLICATIONS

The present application includes subject matter disclosed in and claims priority to a provisional application entitled "Method and Article for Patching Fabric Openings with a Distressed Fabric Patch" filed Nov. 10, 2014 and assigned Ser. No. 62/077,379 describing an invention made by the present inventor.

BACKGROUND OF THE INVENTION

1. Field of the Invention

The present invention relates to patching the distressed area of a pair of denims and, more particularly, to a patch for replicating or for otherwise repairing a damaged distressed area of denim and a method for making same.

2. Description of Related Prior Art

Denim jeans, sometimes referred to as denim, are sometimes purposely distressed to create areas where only parallel threads remain. The purpose for doing so is to create so-called vintage jeans that are very popular with a certain segment of society. Denim jeans that have been worn over a period of time naturally develop such distressed areas.

Generally, the threads in a distressed area can render visible to some extent the underlying skin or garment. With normal wear, the threads in the distressed area become broken to a lesser or greater extent. The resulting lack of threads is generally considered unacceptable by the societal group favoring vintage jeans.

To patch the damaged distressed area with a patch of denim sewn or otherwise attached to cover the distressed area at the front or the back of the fabric is considered destructive of the vintage look.

Sometimes denim jeans become torn or otherwise damaged. Such damaged area can be trimmed to create a clear opening, which opening can be patched with a piece of denim fabric. If the denim jeans are vintage jeans and the intention is that of maintaining the look of vintage jeans, such look would be compromised.

SUMMARY OF THE INVENTION

The present invention is directed to repairing a damaged or distressed area in vintage jeans (denim) with a patch that will replicate the missing and/or damaged threads. The patch is basically secured to the inside surface of the denim in an overlapping relationship with the distressed area. The patch is formed by a plurality of parallel aligned threads secured to adhesive on one side of a transparent sheet. A piece of fabric, such as a see-through (translucent) fabric, is adhesively attached to the other side of the sheet to serve as a backing and support for the threads. The patch is cut to a size sufficient to overlap the damaged or distressed area and secured to the perimeter of the area at the back side of the denim by strips of adhesive circumscribing the area.

It is therefore a primary object of the present invention to preserve the look of vintage jeans after a distressed area has been damaged due to wear or otherwise.

Another object of the present invention is to provide an easily attachable patch for replicating the threads previously existing in a distressed area of denim.

Still another object of the present invention is to provide an inexpensive patch for the distressed area in denim.

Another object of the present invention is to provide an original look to a pair of damaged distressed denim jeans.

A further object of the present invention is to provide a patch easily mountable by a user to distressed areas of vintage jeans.

A still further object of the present invention is to provide a method for fabricating a patch for repairing a distressed area in denim.

A still further object of the present invention is to provide a method for patching the distressed area in a pair of vintage jeans.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which:

FIG. 1 illustrates the leg of a pair of vintage jeans and showing a distressed area;

FIG. 2 illustrates the components of a patch for repairing the distressed area of a pair of vintage jeans;

FIG. 3 illustrates the patch incorporating the elements shown in FIG. 2;

FIG. 4 illustrates a cross sectional view taken along lines 4-4, as shown in FIG. 3;

FIG. 5 illustrates a method of securing the patch to the distressed area of a pair of vintage jeans;

FIG. 6 is a cross sectional view taken along line 6-6 as shown in FIG. 5; and

FIG. 7 is a cross sectional view taken along lines 7-7, as shown in FIG. 6, and illustrates a section of a pair of vintage jeans wherein the distressed area has been repaired.

DESCRIPTION OF THE PREFERRED EMBODIMENT

The term "distressed" in the context of denim jeans is a style of denim that is given a vintage look through manufacturing processes. This provides these denim jeans with a look that replicates the look found in conventional denim jeans that have been well worn by a wearer. Many manufacturers purposely fade or age the denim to give a vintage, worn look through methods set by stone washing, enzyme washing, acid washing, sand blasting, emerizing, micro sanding, etc. When these processes are taken to an extreme, fraying hems and seams create whiskers and even ripping and tearing of the denim. However, denim that comes through the stress does not mold to a user's body in the same way as conventional denim jeans.

Typically, distressed denim jeans have areas or discontinuities that are defined by parallel, vertically or horizontally oriented threads. Over a period of time, these threads may become broken to a greater or lesser extent. With some or more of the threads compromised, the skin or undergarment becomes visible. Sometimes, denim jeans become torn inadvertently or they are cut purposely to create a void or discontinuity.

Generally, vintage jeans provided by a manufacturer are relatively expensive because of the additional labor and equipment required to create a vintage (well worn) look. The present invention provides a patch for repairing the worn or damaged distressed area. Alternatively, the patch can be used to cover a deliberately cut void to create an inexpensive pair of vintage jeans.

Referring to FIG. 1 there is illustrated a pant leg 10 of a pair of distressed jeans covering the leg of a user 12. A distressed area 14 is located on the front portion of pant leg 10. The distressed area may be representative of a pair of distressed denim jeans or it may be representative of a patch attached to the inside surface of pant leg 10 to cover the discontinuity in the denim material and create/maintain the look of vintage jeans. For example, this could be an area cut out by the user in order to attach a patch constructed in accordance with the present invention and to thereby provide a vintage look to the pair of denim jeans.

Referring to FIG. 2, the components of a patch 20 constructed in accordance with the teachings of the present invention are shown. A distressed thread bare front 22 may be constructed by either of two methods. First, a manufacturer may take a 36 inch by 60 inch fabric of bleached (white), natural, dyed, stretch or standard denim (also known as twill). Two 28 inch by 36 inch rectangles are distressed using cutting with various pressures and washings to break down the denim to nothing but thread bare horizontal weft fibers held together by a small frame of solid denim. Alternatively, cotton or a polyblend, both 20/2 and 10/2, of unmercerized standard stretchy yarn is wrapped around a 38 inch by 28 inch frame. The yarn is evenly wrapped across the surface of the frame to produce a plurality of spaced apart parallel threads. To positionally maintain the yarn, cotton muslin strips are glued along the edge of the frame to cover the threads that extend across the frame. This is done on opposed sides of the frame to produce sturdy borders to hold the threads in place. Irrespective of which process is used, it produces a plurality of parallel threads 24 retained in place by opposed borders 26, 28. As depicted by hash lines 30, 32, these borders are preferably of a fabric material.

A sheet 40 of double sided polyurethane panel having an adhesive on either side is cut to size with a margin commensurate with the distressed area 14 to be repaired. A suitable polyurethane panel with double sided adhesive is available from Adhesive Films, Inc., located in New Jersey and identified as EXF 546 0.003 or 0.006 gauge. Release paper is disposed on each side of the panel. Release paper 42 is peeled from one side of panel 40 to expose the underlying adhesive 44. Panel 40 is mated with distressed thread bare front 22 to adhere the threads thereto. Preferably, the adhesive is responsive to form a strong bond between threads 24 and panel 40. Backside 46 of panel 40 includes a further release paper 48 to protect the adhesive on the backside of the panel. A stability fabric sheet 50, which may be sheer cotton, tricot, denim, polyblend, organza, chiffon or other material, is adhered to backside 46 of panel 40 after removal of release paper 48.

The adhesive attendant both sides of panel 40 is heat responsive. A heat source, such as a conventional iron, may be applied to either or both parallel threads 24 and/or sheet 50 to ensure permanence.

Patch 20 is depicted in FIGS. 3 and 4. In particular, threads 24 are adhered to panel 40 by adhesive and thereby somewhat protected against damage. Sheet 50 is adhered to the backside of panel 40. As panel 40 may be transparent, the color and texture of sheet 50 may be more or less visible between threads 24. Accordingly, the selection of sheet 50 may be a function to complement or contrast with the surrounding material of pant leg 10.

Referring jointly to FIGS. 5 and 6, the method for attaching patch 20 to cover and overlap a distressed area 14 will be described. The distressed area is represented as a space without any threads extending from the perimeter thereof. However, this is not critical but the final effect will be more pleasing and acceptable if the perimeter of the distressed area is trimmed.

Inside surface 54 of pant leg 10 is depicted in FIG. 5 and patch 20 to be attached thereto. A plurality of strips, such as strips 56, 58, 60, and 62 are like polyurethane panel 40 in having adhesive on opposed sides and covered by release paper. As depicted, strip 56 is attached along one edge of distressed area 14 after the release paper in the rear side of the strip has been removed. Strips 58, 60 and 62 are similarly attached around the perimeter of distressed area. Before removal of the release papers 64, 66, 68 and 70, heat may be applied to activate the adhesive adjacent the uncovered bottom of the strips 56, 58, 60 and 62.

After removal of strips 64, 66, 68 and 70, patch 20, after being trimmed to essentially correspond with the outside perimeter of the plurality of strips, is placed on the adhesive side of the strips. To activate the adhesive, heat may be applied to the patch to ensure that a firm or permanent bond will not fail during bending or twisting of the underlying material. A conventional iron used to iron garments has been found particularly useful to not only apply heat but also to compress the materials and form a strong bond.

FIG. 7 illustrates the exterior surface 64 of pant leg 10 after attachment of patch 20. As depicted, patch 20, at which threads 24 are clearly visible, extends across distressed area 14.

From the above description, it is self evident that a pair of vintage denim jeans which have been damaged or are damaged resulting in a void/opening can be reconstructed to provide the same visual impression as the original vintage denim jeans. Additionally, any tears or other damaged section of the garment can be trimmed to provide a distressed area for attaching a patch constructed in accordance with the present invention and thereby provide a pair of denim jeans with a vintage look.

I claim:

1. A method for covering a discontinuity in an article of denim clothing, said method comprising the steps of:
   (a) adhering a plurality of side by side threads to one side of a double-sided adhesive panel;
   (b) attaching a fabric material to the other side of the panel to form a patch;
   (c) securing one or more double sided adhesive strips in proximity to the edges of the discontinuity; and
   (d) laying the patch on the one or more double sided adhesive strips to expose the side by side threads through the discontinuity.

2. The method as set forth in claim 1 wherein said step of adhering includes the step of applying a heat source to the double sided adhesive panel.

3. The method as set forth in claim 2 including the step of removing a release paper in turn from each side of the double sided adhesive panel prior to exercise of said step of applying.

4. The method as set forth in claim 1 wherein said step of attaching includes the step of applying a heat source to the fabric material.

5. The method as set forth in claim 4 wherein the heat source is an iron.

6. The method as set forth in claim 1 including the step of trimming the edges of the discontinuity prior to exercise of said step of laying.

7. The method as set forth in claim 1 wherein said panel is a double sided polyurethane adhesive.

8. The method as set forth in claim 3 wherein said panel is a double sided polyurethane adhesive.

9. A method for covering a discontinuity in an article of clothing, said method comprising the steps of:
   (a) adhering a plurality of side by side threads to one side of a double sided adhesive panel;
   (b) attaching a fabric material to the other side of the panel;
   (c) securing a second double-sided adhesive along an edge of the discontinuity;
   (d) laying the panel on the second double-sided adhesive; and
   (e) exposing at least a portion of the plurality of side by side threads through the discontinuity.

10. The method as set forth in claim 9 wherein the double sided adhesive panel includes a heat activated adhesive and further including the step of applying heat to the double-sided adhesive panel to exercise said steps of adhering and attaching.

11. The method as set forth in claim 9 wherein said step of laying provides for coupling the panel to the article of clothing with the second double-sided adhesive.

12. The method as set forth in claim 11 including the step of trimming the edges of the discontinuity prior to exercise of said step of securing.

13. The method as set forth in claim 9 wherein the second double-sided adhesive circumscribes the discontinuity.

14. The method as set forth in claim 9 wherein said step of laying comprises setting the plurality of side by side threads adjacent the second double-sided adhesive.

\* \* \* \* \*